(12) United States Patent
Auer

(10) Patent No.: US 7,789,351 B2
(45) Date of Patent: Sep. 7, 2010

(54) CLAMPING INSERT

(75) Inventor: Marcus Auer, Schwebheim (DE)

(73) Assignee: SRAM Deutschland GmbH, Schweinfurt (DE)

( * ) Notice: Subject to any disclaimer, the term of this patent is extended or adjusted under 35 U.S.C. 154(b) by 165 days.

(21) Appl. No.: 11/161,343

(22) Filed: Jul. 29, 2005

(65) Prior Publication Data

US 2006/0029465 A1   Feb. 9, 2006

(30) Foreign Application Priority Data

Aug. 4, 2004   (DE) ....................... 10 2004 037 740

(51) Int. Cl.
*F16L 3/08* (2006.01)
*B62M 25/04* (2006.01)

(52) U.S. Cl. .................... 248/74.3; 24/16 PB; 24/20 R; 74/551.2; 248/74.1; 248/74.2; 248/69

(58) Field of Classification Search ................ 248/49, 248/62, 68.1, 69, 74.1, 74.2, 74.3, 73; 24/20 R, 24/16 PB, 482, 484, 489, 499; 74/502.2, 74/551.1, 551.2, 551.8, 489
See application file for complete search history.

(56) References Cited

U.S. PATENT DOCUMENTS

| 4,478,381 | A |   | 10/1984 | Pittion et al. |         |
|-----------|---|---|---------|----------------|---------|
| 5,002,520 | A |   | 3/1991  | Greenlaw       |         |
| 5,234,233 | A | * | 8/1993  | Fix            | 285/23  |
| 5,247,852 | A |   | 9/1993  | Guerr          |         |
| 5,257,768 | A | * | 11/1993 | Juenemann et al. | 248/604 |
| 5,388,321 | A | * | 2/1995  | Farrell        | 29/447  |
| 5,620,209 | A | * | 4/1997  | Sauer          | 285/23  |
| 5,772,253 | A |   | 6/1998  | Hodge et al.   |         |
| 5,772,257 | A |   | 6/1998  | Webb et al.    |         |
| 5,820,166 | A | * | 10/1998 | Webb           | 285/23  |
| 6,000,104 | A | * | 12/1999 | Mann           | 24/274 R |
| 6,056,332 | A | * | 5/2000  | Foster         | 285/367 |
| 6,067,875 | A | * | 5/2000  | Ritchey et al. | 74/502.2 |
| 6,126,119 | A | * | 10/2000 | Giangrasso     | 248/58  |

(Continued)

FOREIGN PATENT DOCUMENTS

DE   1 986 289 U   5/1968

(Continued)

*Primary Examiner*—Amy J Sterling
*Assistant Examiner*—Tan Le
(74) *Attorney, Agent, or Firm*—Milan Milosevic; Lisa Serdynski

(57) ABSTRACT

A flexible clamping insert for adapting the clamping contour of a clamping device to correspond to an outer contour of a bicycle frame. The clamping insert includes a mounting section, a pivoting section and a biasing section connecting the mounting section and the pivoting section. The clamping insert is formed as one piece from a flexible material. The mounting section includes at least one attachment feature for securing the mounting section to a fixed clamping arm of the clamping device. The mounting and pivoting sections have a concave contour and the biasing section has a convex, resulting in the clamping insert, in the uninstalled state, having a C-shaped contour. When installed on the clamping device, the biasing section biases the pivoting section toward an open position, resulting in the pivoting arm to open and allow the clamping insert and device to be mounted on to the bicycle frame. The one-piece clamping insert is cost-effective and is simple to snap onto the clamping device without the use of tools.

17 Claims, 5 Drawing Sheets

U.S. PATENT DOCUMENTS

| | | |
|---|---|---|
| 6,343,772 B1 * | 2/2002 | Oi ................................ 248/75 |
| 7,093,808 B2 * | 8/2006 | Yuzuriha et al. .............. 248/62 |
| 2003/0159255 A1 * | 8/2003 | Senovich et al. ............ 24/20 R |
| 2006/0029465 A1 * | 2/2006 | Auer .......................... 403/383 |
| 2008/0148899 A1 * | 6/2008 | Kua et al. .................. 74/551.8 |

FOREIGN PATENT DOCUMENTS

| | | |
|---|---|---|
| DE | 93 07 485 U1 | 7/1993 |
| DE | 295 15 357 U1 | 12/1995 |
| DE | 197 26 331 A1 | 1/1998 |
| EP | 0 069 223 A1 | 1/1983 |
| EP | 0 079 457 A1 | 5/1983 |
| EP | 1 040 991 A2 | 10/2000 |
| EP | 1 040 992 A2 | 10/2000 |
| EP | 1 439 114 A2 | 7/2004 |
| GB | 572691 | 10/1945 |
| GB | 577659 | 5/1946 |
| GB | 2 146 064 A | 4/1985 |

\* cited by examiner

CLAMPING INSERT

BACKGROUND OF THE INVENTION

The present invention relates to clamping inserts for use with clamping devices for mounting derailleurs to bicycle frames, and more particularly, to a one-piece flexible clamping insert configured to make a derailleur clamping device adaptable for mounting to a variety of frames.

A typical bicycle derailleur, in particular a front derailleur, is mounted to a seat tube of the bicycle frame by a clamping device or simply a "clamp." The clamp may be part of the derailleur body or housing, or it may be separate from the housing. One drawback of clamps is their inability to accommodate a wide variety of bicycle frames, making it necessary to precisely match frames with clamps having corresponding diameters.

European Patent No. 1 040 991 A2 discloses an adapter for decreasing the clamping diameter of a front derailleur clamp to conform to the diameter of a bicycle frame tube. This adapter generally includes two insert parts, each having a plastic fastening frame and a metal spacing element. The clamp includes two arms pivotally coupled together and fastening frames secured to the arms. The spacing element has an inner surface corresponding to the diameter of the frame tube, and a wall thickness that occupies the space between the clamp and the frame tube. In order to adapt the clamp for a different frame tube diameter, two new spacing elements—with corresponding new diameters—are required. The two new spacing elements must then be inserted into the fastening frames arranged on the arms of the clamping device. One disadvantage of this adapter is that it includes four pieces—two plastic frames and two aluminum spacing elements—resulting in costly production and time-consuming installation. Accordingly, there is a need for a one-piece clamping insert that is simple to install.

SUMMARY OF THE INVENTION

The present invention describes a one-piece clamping insert that is both cost effective and easy to install. The clamping insert is configured so that it can be readily and securely snap-fit onto the derailleur clamp without tools. As installed on the clamp, the clamping insert is configured to bias the derailleur clamp toward an open or retracted position allowing the clamp to be easily positioned over the frame tube without scraping the surface of the tube. A typical derailleur clamp includes two clamping arms. One arm is fixedly attached to the derailleur while the other arm is pivotally attached to the derailleur. Alternatively, the pivoting clamping arm can be pivotally attached directly to the fixed clamping arm.

The clamping insert includes a mounting section, a pivoting section, and a biasing section connecting the mounting section to the pivoting section. The mounting section extends substantially along the fixed clamping arm. An inner surface of the mounting section of the clamping insert substantially conforms to an outer contour of the frame tube, while an outer surface of the mounting section substantially conforms to an inner surface of the fixed clamping arm. The outer surface of the mounting section preferably includes a mounting guide and a rim having at least one attachment nose. To attach the clamping insert to the fixed clamping arm, the mounting guide is inserted into a recess or cutout on the inner surface of the fixed clamping arm, to properly align the clamping insert along the derailleur clamp. The attachment nose is then readily snapped over a portion—and the rim over an edge—of the fixed clamping arm. The attachment nose, rim and mounting guide allow the clamping insert to be easily clipped to the derailleur clamp without the use of tools. The mounting section further preferably includes a stop element protruding from the mounting section—preferably near a free end of the mounting section—the stop element configured to abut an end of the fixed clamping arm to prevent displacement of the clamping insert relative to the fixed clamping arm. The pivoting section of the clamping insert extends substantially along the pivoting clamping arm. The pivoting section preferably includes two tabs formed on its outer surface, the tabs configured to be received by two corresponding recesses or cutouts on the inner surface of the pivoting clamping arm, to reliably attach the pivoting section to the pivoting clamping arm. The clamping insert is preferably attached to the derailleur clamp when in its open or retracted position.

The mounting and pivoting sections of the clamping insert preferably have a concave contour while the biasing section preferably has a convex or substantially straight contour. The wall thickness of the biasing section is thinner than the wall thickness of the mounting and pivoting sections, the thinned biasing section effectively forming a flexible hinge therebetween. When the clamping insert is attached to the derailleur clamp, the biasing section is preferably substantially aligned with the pivotal connection between the pivoting clamping arm and the derailleur. Further, the clamping insert preferably forms a C-shaped contour when not attached to the clamp. The reversely-contoured biasing section biases the pivoting section of the clamping insert toward an open or retracted position such that when the fastener holding the two clamping arms together is released, the clamping insert springs the pivoting clamping arm open, holding the derailleur clamp in an open position. Alternatively, a substantially straight biasing section will likewise function to spread the clamp toward an open position. Additionally, the inner surface of the clamping insert may be finished with a textured surface or include an adhesive layer to provide a more secure connection between the clamping insert and the frame tube.

In another embodiment of the present invention, the clamping insert may include two reinforcing inserts located in the mounting and pivoting sections. The reinforcing inserts stiffen the clamping insert to counteract creep deformation of plastic parts. The clamping insert is preferably made of plastic while the reinforcing inserts are preferably made of aluminum and integrated into the clamping insert.

These and other features and advantages of the present invention will be more fully understood from the following description of one or more embodiments of the invention, taken together with the accompanying drawings.

DETAILED DESCRIPTION

Figure 1:
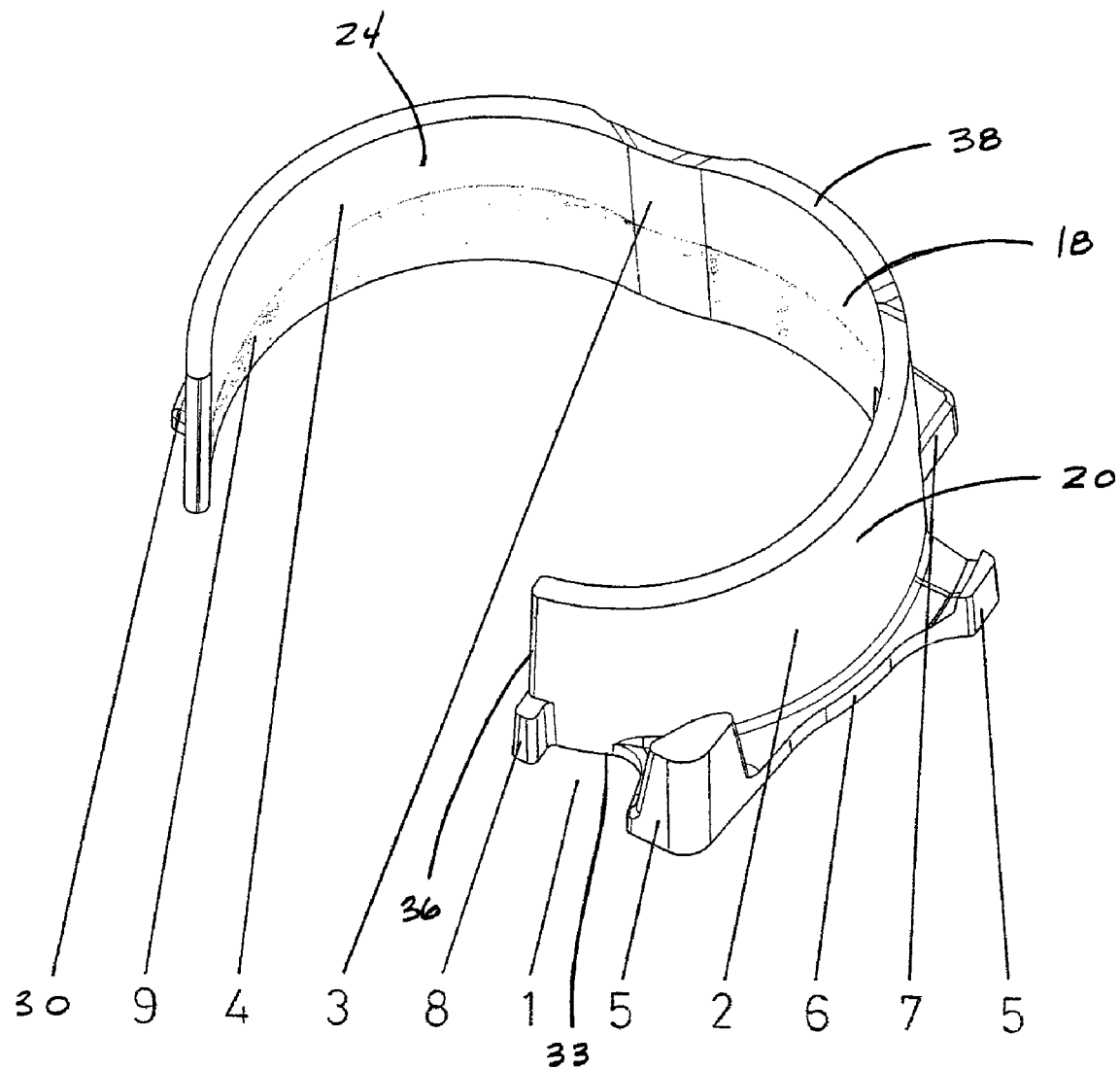
FIG. 1 is a perspective view of a clamping insert in accordance with one embodiment of the present invention.
Figure 2:
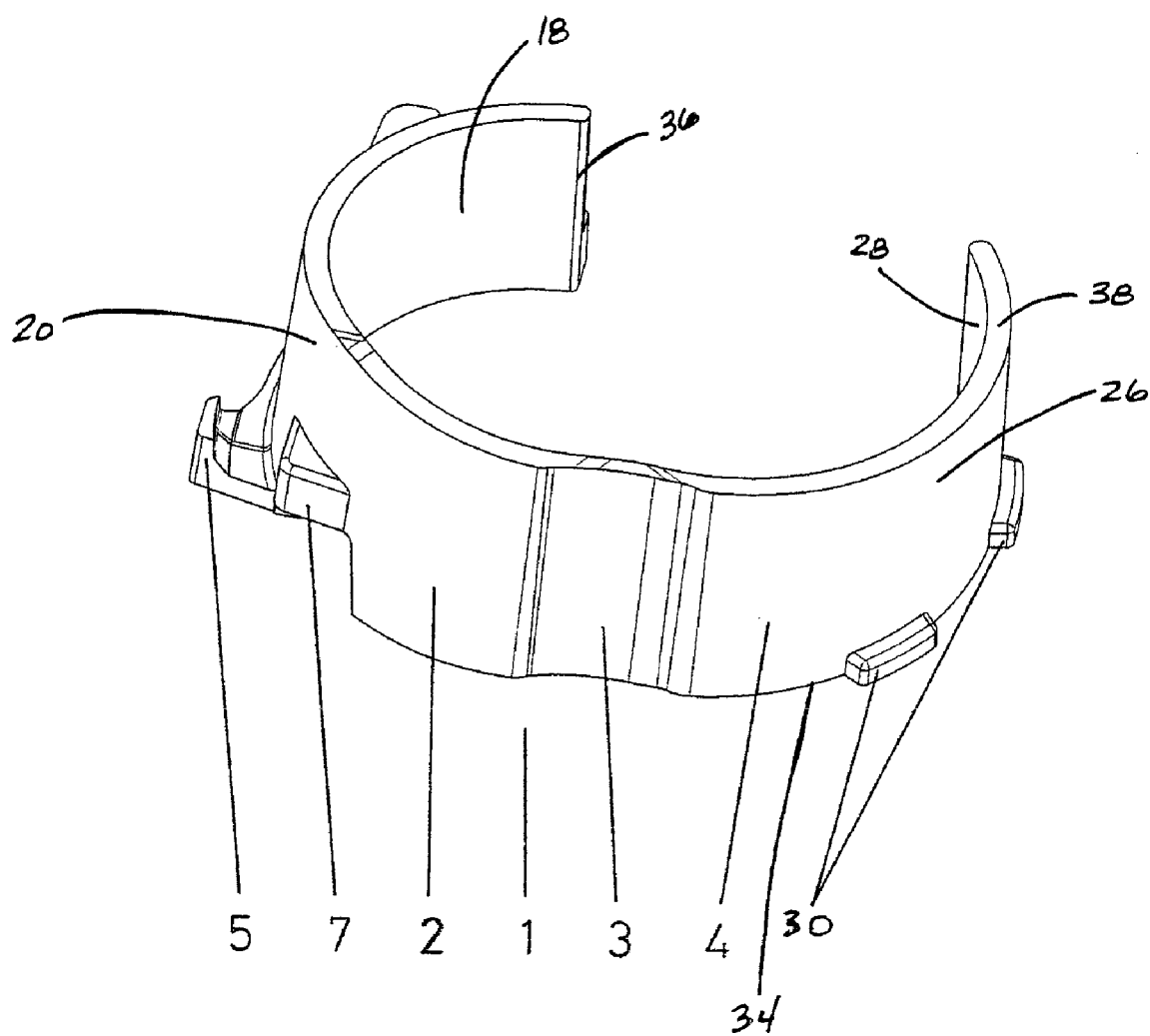
FIG. 2 is a side perspective view of the clamping insert of FIG. 1 showing a pivoting section of the clamping insert.

FIGS. 1, 2, 4 and 5 illustrate a clamping insert 1 according to one embodiment of the present invention. The clamping insert 1 is attachable to an inner surface of a clamping device 16 (in this embodiment, a front derailleur clamp), to adapt the clamping contour of the clamping device 16 for mounting to a bicycle frame (not shown). The clamping device 16, or simply "clamp," includes fixed and pivoting clamping arms 11, 14, respectively. The fixed clamping arm 11 is fixedly connected to the derailleur 12, and the pivoting clamping arm 14 is pivotally connected to the derailleur 12. The pivoting clamping arm 14 pivotable about an axis 40. A fastener 13, in this embodiment a screw, connects the two clamping arms 11, 14 to secure the clamp 16 to the bicycle frame.

In this embodiment, the clamping insert 1 is formed as one piece and is made from a flexible material, preferably plastic. The clamping insert 1 includes a mounting section 2, a pivoting section 4, and a biasing section 3 connecting the mounting and pivoting sections. An inner surface 18 of the mounting section 2 substantially conforms to an outer contour of the frame tube, while an outer surface 20 of the mounting section 2 substantially conforms to an inner surface 22 of the fixed clamping arm 11. The outer surface 20 of the mounting section 2 includes a mounting guide 7 and a rim 6 having two attachment noses 5. The rim 6 extends radially outwardly from an edge 33 of the mounting section 2. To attach the mounting section 2 to the fixed clamping arm 11, the mounting guide 7 is inserted into a recess or cutout on the inner surface 22 of the fixed clamping arm 11, to properly align the clamping insert along the clamp, and the rim 6 and attachment noses 5 are snapped over an edge 32 and a portion 35 of the fixed clamping arm 11, respectively. So configured, the mounting section 2 of the clamping insert 1 is supported by the fixed clamping arm 11, even when the clamp 16 is in an open or retracted position. Further, this configuration allows the clamping insert 1 to be attached to the clamp 16 without the use of tools. The mounting section 2 further includes a protruding stop element 8, preferably disposed near a free end 36 of the mounting section 2, the stop element configured to abut an end of the fixed clamping arm 11 for preventing displacement or shifting of the clamping insert 1 relative to the clamp 16. An inner surface 24 of the pivoting section 4 of the clamping insert 1 substantially conforms to the outer contour of the frame tube, while an outer surface 26 of the pivoting section 4 substantially conforms to the inner surface 28 of the pivoting clamping arm 14. The pivoting section 4 corresponding recesses or cutouts (not shown) on the pivoting clamping arm 14.

The pivoting section 4 of the clamping insert 1 is connected to the mounting section 2 by the biasing section 3. The mounting section 2 and the pivoting section 4 have concave contours. In contrast, the biasing section 3 has a convex contour, or alternatively, is substantially straight. The change in contour of the biasing section 3 permitting it to bias the mounting and pivoting sections 2, 4 toward an open position when the clamping insert is attached to the clamp 16. Additionally, the biasing section 3 has a thinner wall thickness than a wall thickness of the adjoining mounting and pivoting sections 2, 4, allowing the biasing section 3 to be more flexible than the mounting and pivoting sections 2, 4 and effectively forming a flexible hinge therebetween without eliminating its biasing feature. When the clamping insert 1 is attached to the derailleur clamp 16, the biasing section 3 is substantially aligned with the pivotal connection between the pivoting clamping arm 14 and the derailleur 12 to allow the pivoting section 4 of the clamping insert 1 to pivot with the pivoting clamping arm 14. To more securely mount the clamp 16 to the frame tube, the inner surface of the clamping insert 1 preferably has a textured surface or includes an adhesive layer 9.

Figure 3:
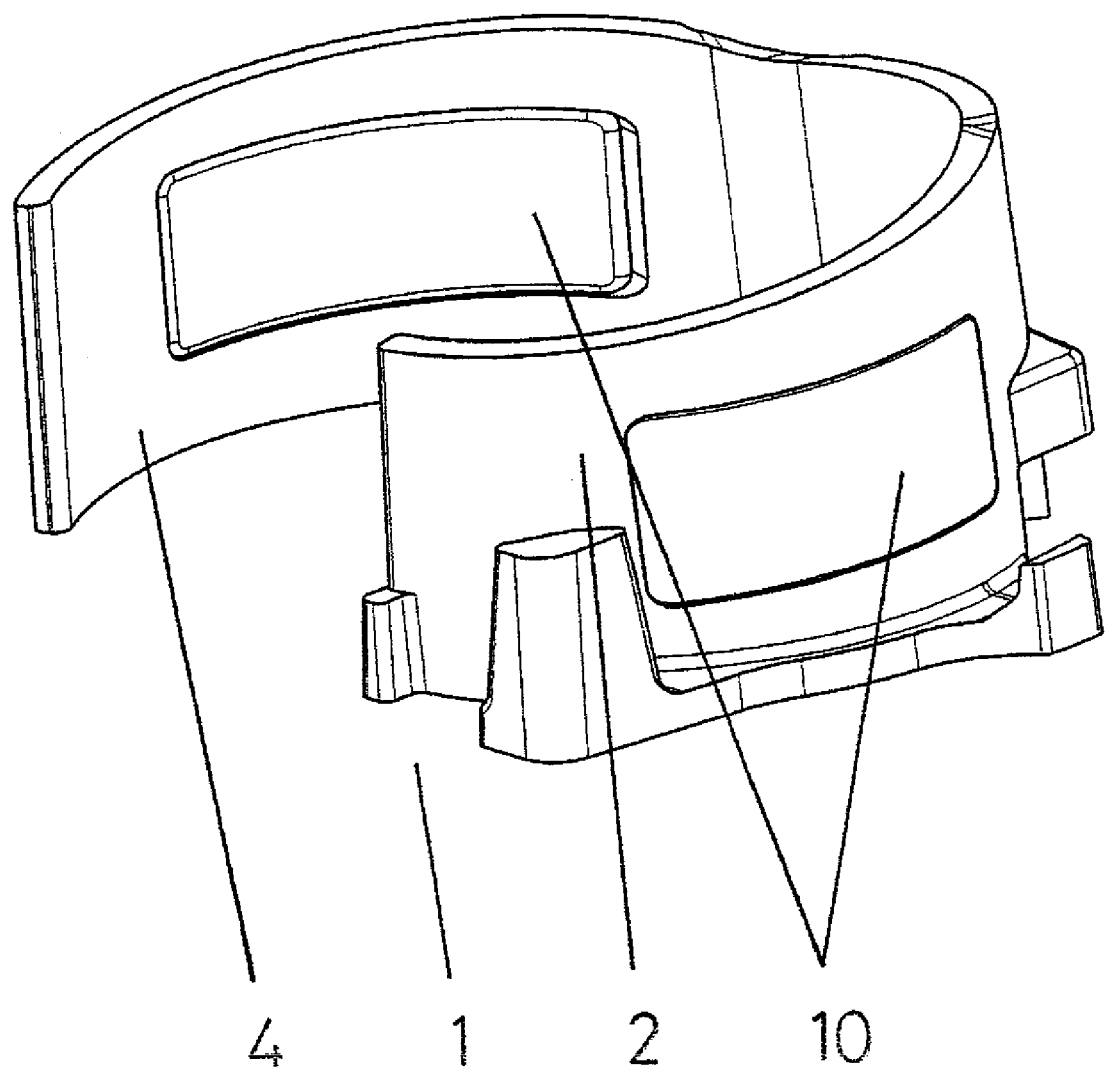
FIG. 3 is a perspective view of a clamping insert in accordance with another embodiment of the present invention.

Looking to FIG. 3, the clamping insert 1 may include two reinforcing inserts 10 according to another embodiment of the present invention. The reinforcing inserts 10 are preferably made of metal and located in the mounting and pivoting sections 2, 4. The reinforcing inserts 10 stiffen the clamping insert 1 to counteract creep deformation of plastic parts. More preferably, the reinforcing inserts 10 are made of aluminum and molded into the plastic clamping insert 1. The inner surface of the reinforcing inserts 10 is configured to conform to the contour of the frame tube.

Figure 4:
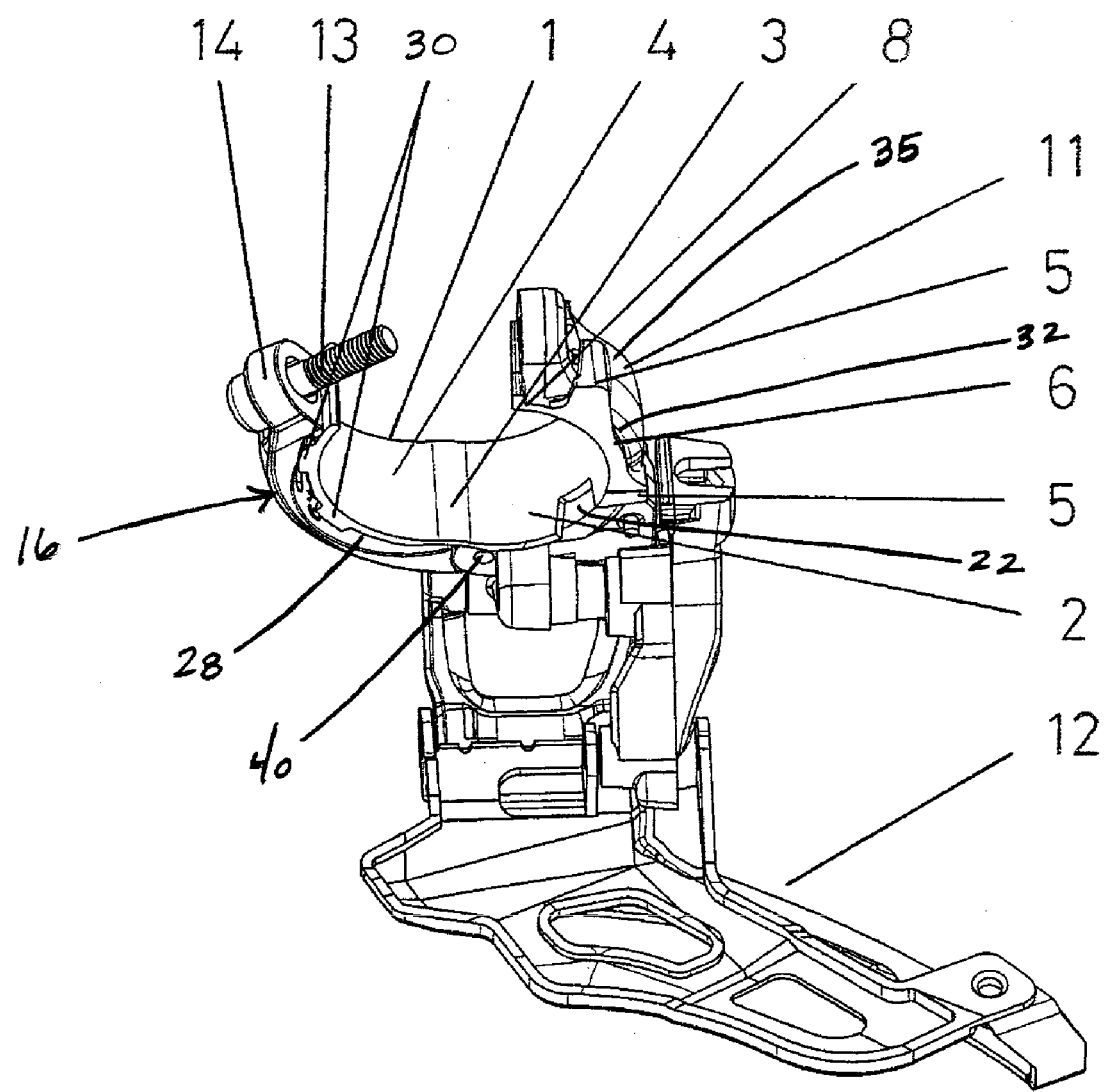
FIG. 4 is a top perspective view of the clamping insert of FIG. 1 connected to a derailleur clamp.
Figure 5:
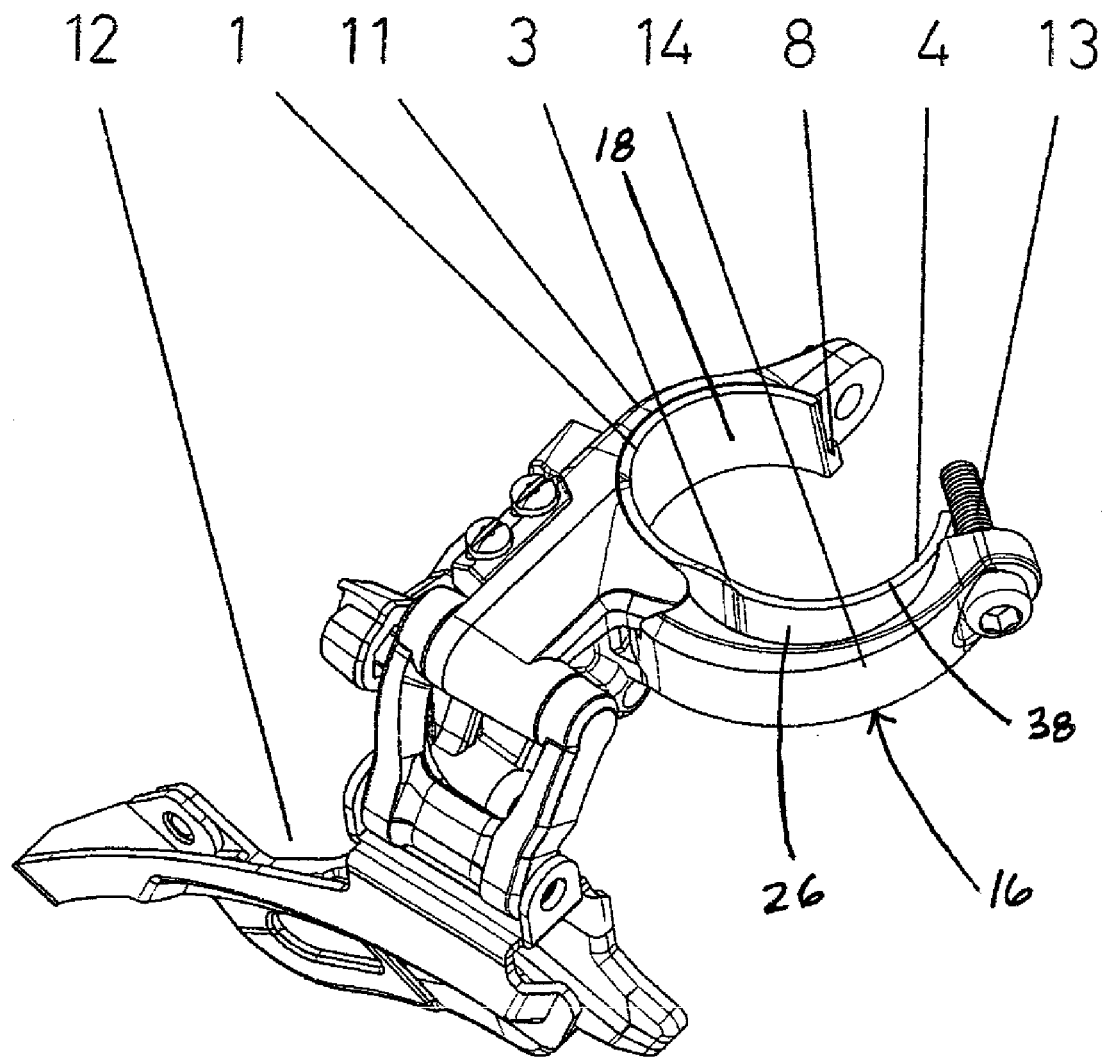
FIG. 5 is a bottom perspective view of the clamping insert of FIG. 1 connected to the derailleur clamp.

Looking to FIGS. 4 and 5, the clamping insert 1 is attached to the derailleur clamp 16 by snapping the mounting section 2 onto the fixed clamping arm 11. The attachment noses 5 are configured to cradle a portion of the fixed clamp arm 11 and the mounting guide 7 is displaceably received in the recess or cutout on the inner surface 22 of the fixed clamping arm 11 to properly align the mounting section 2 along the fixed clamping arm 11. The stop element 8 prevents the clamping insert 1 from shifting when the clamp 16 is in an open position. Tabs 30, formed near the edge 34 of the pivoting section 4, help secure the clamping insert 1 onto the pivoting clamping arm 14 when the clamp 16 is in its open and closed positions. When the derailleur clamp 16 is mounted to the frame, an upper edge 38 of the clamping insert 1 is preferably substantially flush with the clamp 16.

While this invention has been described by reference to one or more preferred embodiments, it should be understood that numerous changes could be made without departing from the spirit and scope of the inventive concepts described. Accordingly, it is intended that the invention not be limited to the disclosed embodiments, but that it be afforded the full scope of protection permitted by the language of the following claims.

What is claimed is:

1. A clamping insert for adapting a clamping contour of a clamping device to a bicycle frame member, the clamping device having a pivoting clamping arm pivotable relative to a fixed clamping arm, the pivoting and fixed clamping arms configured to grasp the bicycle frame member and be secured thereto, the clamping insert comprising:
   a mounting section configured to adjoin the fixed clamping arm, the mounting section has an inner surface configured to substantially conform to an outer contour of the bicycle frame member, the mounting section including at least one attachment feature for securing the mounting section to the fixed clamping arm, the at least one attachment feature disposed on an outer surface of the mounting section and including at least one of an attachment nose, a rim, a mounting guide and a stop element;
   a pivoting section pivotable with the pivoting clamping arm; and
   a biasing section connecting the mounting section and the pivoting section, the biasing section configured to bias the clamping device to release the bicycle frame member,
   the mounting, pivoting and biasing sections embodying a single piece and made of a flexible material, the clamping insert configured to be disposed between the clamping device and the bicycle frame member.

2. The clamping insert according to claim 1, wherein the mounting, pivoting and biasing sections form a C-shaped contour in an uninstalled state.

3. The clamping insert according to claim 1, wherein the biasing section configured to bias the pivoting section toward an open position when the clamping insert is secured to the clamping device.

4. The clamping insert according to claim 3, wherein the pivoting section includes at least one attachment feature for securing the pivoting section to the pivoting clamping arm.

5. The clamping insert according to claim 4, wherein the attachment feature of the pivoting section includes at least one tab protruding from an outer surface of the pivoting section.

6. The clamping insert according to claim 1, wherein the attachment nose is configured to cradle a portion of the fixed clamping arm.

7. The clamping insert according to claim 1, wherein the rim extends radially outwardly from an edge of the mounting section.

8. The clamping insert according to claim 1, wherein the mounting guide is configured to be displaceably received in a recess on an inner surface of the fixed clamping arm.

9. The clamping insert according to claim 1, wherein the stop element is disposed near a free end of the mounting section, the stop element protruding from an outer surface of the mounting section and configured to abut an end of the fixed clamping arm to prevent displacement of the clamping insert relative to the fixed clamping arm.

10. The clamping insert according to claim 3, wherein the biasing section has a convex contour relative to concave contours of the mounting section and the pivoting section, the biasing section having a thinner wall thickness than a wall thickness of the mounting and pivoting sections.

11. The clamping insert according to claim 3, wherein the biasing section has a substantially straight contour relative to concave contours of the mounting section and the pivoting section, the biasing section having a thinner wall thickness than a wall thickness of the mounting and pivoting sections.

12. The clamping insert according to claim 3, wherein when secured to the clamping device, the biasing section is configured to bias the pivoting section open relative to the fixed clamping arm.

13. The clamping insert according to claim 1, wherein at least a portion of an inner surface of the clamping insert is textured.

14. The clamping insert according to claim 1, wherein at least a portion of an inner surface of the clamping insert has an adhesive layer.

15. The clamping insert according to claim 1, wherein the mounting section and pivoting section include reinforcing inserts.

16. A clamping insert for adapting a clamping contour of a clamping device to a bicycle frame member, the clamping device having a pivoting clamping arm pivotable about an axis relative to a fixed clamping arm, the pivoting and fixed clamping arms configured to grasp the bicycle frame member and be secured thereto, the clamping insert comprising:
 a mounting section, the mounting section has an inner surface configured to substantially conform to an outer contour of the bicycle frame member, the mounting section including at least one attachment feature for securing the mounting section to the fixed clamping arm, the at least one attachment feature disposed on an outer surface of the mounting section and including at least one of an attachment nose, a rim, a mounting guide and a stop element;
 a pivoting section; and
 a biasing section connecting the mounting section to the pivoting section and forming a hinge therebetween configured to be substantially aligned with the clamping device axis such that the pivoting section is pivotable with the pivoting clamping arm,
 the mounting, pivoting and biasing sections embodying a single piece and made of a flexible material, the clamping insert configured to be disposed between the clamping device and the bicycle frame member.

17. A clamping assembly comprising:
 a clamping device having a pivoting clamping arm pivotable relative to a fixed clamping arm, the pivoting and fixed clamping arms configured to grasp a bicycle frame member and be secured thereto; and
 a clamping insert for adapting a clamping contour of the clamping device to the bicycle frame member, the clamping insert including:
  a mounting section adjoining the fixed clamping arm and including at least one attachment feature for securing the mounting section to the fixed clamping arm;
  a pivoting section pivotable with the pivoting clamping arm; and
  a biasing section connecting the mounting section and the pivoting section, the biasing section biasing the clamping device to release the bicycle frame member,
 the mounting, pivoting and biasing sections embodying a single piece and made of a flexible material, the clamping insert configured to be disposed between the clamping device and the bicycle frame member.

* * * * *